No. 712,298. Patented Oct. 28, 1902.
E. B. HAM & J. W. SHIPLEY.
COTTON CLEANER.
(Application filed Feb. 25, 1902.)
(No Model.)
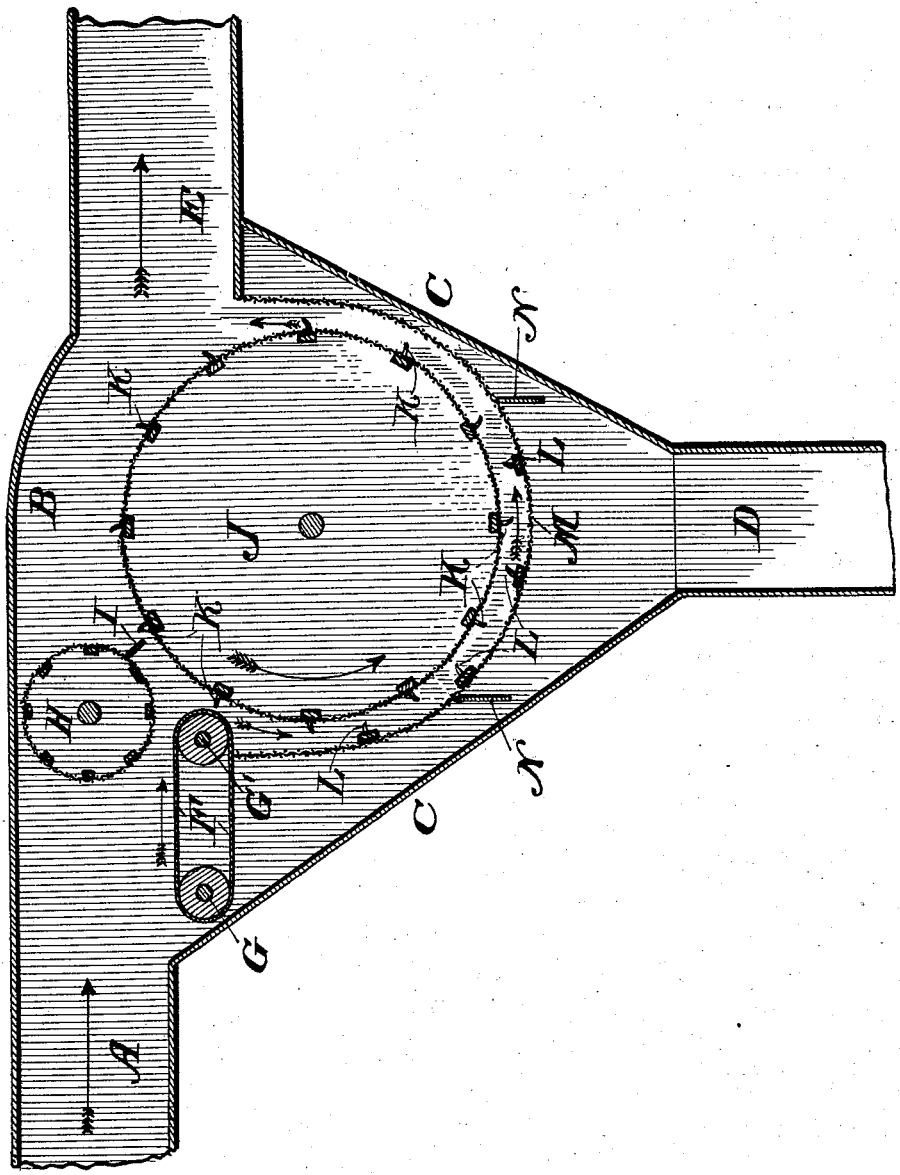
WITNESSES:
Jos. A. Ryan
Harrison B. Brown
INVENTORS
Elijah B. Ham.
John W. Shipley.
BY Munn & Co.
ATTORNEYS

UNITED STATES PATENT OFFICE.

ELIJAH B. HAM AND JOHN W. SHIPLEY, OF JENNINGS, OKLAHOMA TERRITORY.

COTTON-CLEANER.

SPECIFICATION forming part of Letters Patent No. 712,298, dated October 28, 1902.

Application filed February 25, 1902. Serial No. 95,520. (No model.)

*To all whom it may concern:*

Be it known that we, ELIJAH B. HAM and JOHN W. SHIPLEY, of Jennings, in the county of Pawnee and Territory of Oklahoma, have invented certain new and useful Improvements in Cotton-Cleaners, of which the following is a specification.

This invention has for its object to provide means in the well-known pneumatic tube for handling seed-cotton by atmospheric suction that will thoroughly clear the cotton before it gets to the gin-stands; and the invention consists in a special cleaning apparatus hereinafter fully described designed to be located at any desired point in the gin-room or outside.

We will now proceed to describe our invention in detail, reference being had to the accompanying drawing, forming a part of our specification, and in which is shown a longitudinal section through a part of a suction-tube and our apparatus.

The handling of seed-cotton by suction-tubes is well known, and consequently in describing our invention it becomes necessary to only say that at some location in the suction-tube we arrange our cleaning apparatus. It may be at the gin-stands or outside near the mouth of the tube. In fact, it may be placed at any desired location with equal advantage so far as the cleaning apparatus is concerned.

In the drawing, A denotes the feed or mouth end of the well-known tube adapted to handle seed-cotton by atmospheric suction.

B represents an enlargement in the suction-tube, having inclined side walls C, terminating into a spout or dirt-discharge tube D, and E is a continuation of the suction-tube, leading the cleaned seed-cotton to the gin-stands or other desired place.

Within the enlarged portion just described of the suction-tube we arrange an endless conveyer F, passing over rollers G G', and at a point near the roller G' provide a cylindrical rotatable screen H, which latter, with a fixed partition I and the conveyer F, closes the suction-tube above an enlarged rotatable screen J. It will be understood that the screens H and J may be connected by pulleys or gearing on their supporting-shafts with some power for rotating them.

The screw J is provided on its outer surface with a series of curved teeth K, which pass between similarly-curved teeth L, projecting upwardly from a concave screen M. The teeth K on the screen J, as also the teeth L of the concave M, are supported by cross-bars in the make-up of said screens, as shown, and the teeth L may be arranged on the concave M, extending from the conveyer to a point below the screen J, as shown, or from end to end of the concave, as may be desired.

To preclude a draft of air around the lower side of the concave M, we arrange two (more or less) baffles or partitions N, extending down to or near the inclined sides C.

With an apparatus such as we have described it is apparent that the seed-cotton will be drawn up the tube A by suction through the tube E and contact the screen H, rotating in the direction indicated by an arrow, which forces it downwardly to the conveyer F and cylinder J. The conveyer forces the cotton along to be engaged by the curved teeth K, which engage and carry it down, as indicated by arrow, in contact with the fixed curved teeth L of the concave M, imparting a combing action with effect to separate or disintegrate the cotton to such degree as will set free any dirt contained therein, the dirt passing down through the screen by gravity or be drawn by an induced draft through the spout D. It is understood that the cotton will be forced along the concave to the communicating section E of the suction-tube and thence to the place where it is to be delivered.

Having thus described our invention, what we claim as new, and desire to secure by Letters Patent, is—

1. The combination with a suction-tube of the character described, of an enlargement having inlet and outlet passages connecting the tube also a lower dirt-exit as shown, two cylindrical screens arranged in the enlargement one above the other and adapted to rotate in the same direction, an endless conveyer extending from the inlet of the said enlargement to a point near both screens, and means for liberating and removing dirt contained in the cotton substantially as described.

2. The combination with a suction-tube of the character described having an enlargement in its passage-way provided with a dirt-exit as shown, of apparatus for cleaning the cotton inclosed by the enlargement, said apparatus consisting of two cylindrical screens rotating in the same direction and arranged one above the other, a fixed partition between the said screens, an endless conveyer extending from the inlet of the enlargement to a point near the screens, a concave screen below the nethermost cylindrical screen and curved teeth on the concave and lower cylindrical screens, substantially as described.

3. In a cotton-cleaner of the character described, the combination with a suitable case or enlargement containing two cylindrical screens rotating in the same direction, also, an endless conveyer extending from the cotton-inlet to a point near the cylindrical screens, also a concave screen below the nethermost cylindrical screen, of partitions depending from the concave screen and means for forcing the cotton between the lower cylindrical screen and the concave involving two sets of curved teeth pointing in the same direction, one set projecting from the concave and the other carried by the contiguous cylindrical screen, substantially as described.

ELIJAH B. HAM.
JOHN W. SHIPLEY.

Witnesses:
G. S. VAN EMAN,
D. E. ROMACK.